(12) United States Patent
Fort

(10) Patent No.: US 8,863,494 B2
(45) Date of Patent: Oct. 21, 2014

(54) TURBINE OUTLET FROZEN GAS CAPTURE APPARATUS AND METHOD

(75) Inventor: James H. Fort, Granby, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 330 days.

(21) Appl. No.: 13/267,627

(22) Filed: Oct. 6, 2011

(65) Prior Publication Data

US 2013/0089406 A1    Apr. 11, 2013

(51) Int. Cl.
| | | |
|---|---|---|
| *F02C 7/00* | (2006.01) | |
| *F01N 3/021* | (2006.01) | |
| *B01D 53/00* | (2006.01) | |
| *F25J 3/06* | (2006.01) | |
| *F01N 3/02* | (2006.01) | |
| *B01D 8/00* | (2006.01) | |

(52) U.S. Cl.
CPC ........... *F25J 3/067* (2013.01); *B01D 2257/504* (2013.01); *F01N 3/0214* (2013.01); *B01D 8/00* (2013.01); *B01D 53/002* (2013.01); *F25J 3/0695* (2013.01); *F25J 2240/02* (2013.01); *F01N 3/02* (2013.01); *B01D 2315/02* (2013.01); *F01N 3/021* (2013.01); *F25J 2205/20* (2013.01); *F01N 3/0215* (2013.01); *B01D 2313/22* (2013.01); *Y02C 10/12* (2013.01); *F25J 2290/42* (2013.01); *Y10S 62/928* (2013.01)
USPC .................................. 60/39.5; 62/532; 62/928

(58) Field of Classification Search
CPC ......... F01N 3/02; F01N 3/021; F01N 3/0214; F01N 3/0215; B01D 8/00; B01D 7/02; B01D 59/08; B01D 2279/30; B01D 2315/02; B01D 2313/22; F24F 3/1423; F24F 3/1429; F24F 2203/10–2203/1096
USPC .......... 62/601, 602, 52.4, 532, 542, 640, 928, 62/55.5, 39.5; 95/113, 277; 96/125; 55/400; 60/39.5
See application file for complete search history.

(56) References Cited

U.S. PATENT DOCUMENTS

| | | | | |
|---|---|---|---|---|
| 3,672,181 | A | | 6/1972 | Tyree, Jr. |
| 4,198,829 | A | * | 4/1980 | Carle .............................. 62/55.5 |
| 4,724,677 | A | * | 2/1988 | Foster ............................. 62/55.5 |
| 4,822,383 | A | | 4/1989 | Brose et al. |
| 4,838,035 | A | * | 6/1989 | Carlson et al. ................. 62/55.5 |
| 5,061,455 | A | | 10/1991 | Brose et al. |
| 5,230,162 | A | * | 7/1993 | Oyler, Jr. ......................... 34/292 |
| 5,590,519 | A | * | 1/1997 | Almlof et al. ................... 60/801 |
| 5,702,508 | A | * | 12/1997 | Moratalla ....................... 96/118 |
| 5,724,805 | A | | 3/1998 | Golomb et al. |
| 5,983,666 | A | | 11/1999 | Straub et al. |
| 7,493,779 | B2 | * | 2/2009 | Amin ............................... 62/617 |
| 7,644,593 | B2 | | 1/2010 | Duraisamy |
| 7,685,820 | B2 | | 3/2010 | Litwin et al. |
| 7,819,932 | B2 | | 10/2010 | Rhinesmith et al. |
| 7,937,948 | B2 | | 5/2011 | Zubrin et al. |

(Continued)

*Primary Examiner* — Allana Lewin
*Assistant Examiner* — Kun Kai Ma
(74) *Attorney, Agent, or Firm* — Cantor Colburn LLP

(57) ABSTRACT

A turbine outlet frozen gas capture apparatus is provided and includes an enclosure divided into first and second chambers, the first chamber being receptive of turbine outlet exhaust including frozen gas, a wheel disposed and configured to be rotatable such that frozen gas received in the first chamber is captured and transported into the second chamber and a heater disposed within the second chamber and configured to vaporize the frozen gas transported therein to thereby produce vaporized gas.

15 Claims, 2 Drawing Sheets

(56) References Cited

U.S. PATENT DOCUMENTS

| | | |
|---|---|---|
| 7,947,240 B2 | 5/2011 | Vandor |
| 2005/0247122 A1 * | 11/2005 | Sallee et al. .................. 73/273 |
| 2010/0319354 A1 | 12/2010 | Guidati et al. |
| 2011/0005244 A1 | 1/2011 | Finney et al. |
| 2011/0005389 A1 | 1/2011 | Webley et al. |
| 2011/0167866 A1 | 7/2011 | Evans-Beauchamp |
| 2011/0192191 A1 | 8/2011 | Timminns et al. |

* cited by examiner

TURBINE OUTLET FROZEN GAS CAPTURE APPARATUS AND METHOD

BACKGROUND OF THE INVENTION

The subject matter disclosed herein relates to a turbine outlet frozen gas capture apparatus and method.

A current application of turbo-machine technology is the use of turbo-machinery to separate one gas from another in a gas stream. In these applications, the turbo-machine tends to lower a temperature of the subject gas to about −225° Fahrenheit, which can cause the subject gas (i.e., carbon dioxide) to freeze. Because the subject gas flows through the turbo-machinery will relatively high velocities and the turbo-machinery tends to cause the temperature to decrease suddenly, the frozen gas can exist as fine particulate matter that can clog or damage downstream elements.

BRIEF DESCRIPTION OF THE INVENTION

According to one aspect of the invention, a turbine outlet frozen gas capture apparatus is provided and includes an enclosure divided into first and second chambers, the first chamber being receptive of turbine outlet exhaust including frozen gas, a wheel disposed and configured to be rotatable such that frozen gas received in the first chamber is captured and transported into the second chamber and a heater disposed within the second chamber and configured to vaporize the frozen gas transported therein to thereby produce vaporized gas.

According to another aspect of the invention, a turbine outlet frozen gas capture apparatus is provided and includes an enclosure, a divider disposed to define in the enclosure first and second chambers, the first chamber being receptive of turbine outlet exhaust including frozen gas, a wheel disposed to straddle the divider and configured to be rotatable such that frozen gas received in the first chamber is captured by the wheel and transported by wheel rotation into the second chamber, a heater disposed within the second chamber and configured to vaporize the frozen gas transported therein to thereby produce vaporized gas and a system configured to draw the vaporized gas from the second chamber and to maintain a pressure differential between the first and second chambers sufficient to prevent flow of the turbine outlet exhaust across the divider.

According to yet another aspect of the invention, a turbine outlet frozen gas capture method is provided and includes receiving turbine outlet exhaust including frozen gas within a first chamber of an enclosure divided into the first chamber and a second chamber, capturing the frozen gas in the first chamber and transporting the captured frozen gas into the second chamber, heating the frozen gas in the second chamber to produce vaporized gas and drawing the vaporized gas from the second chamber and maintaining a pressure differential between the first and second chambers sufficient to prevent flow of the turbine outlet exhaust from the first chamber to the second chamber.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
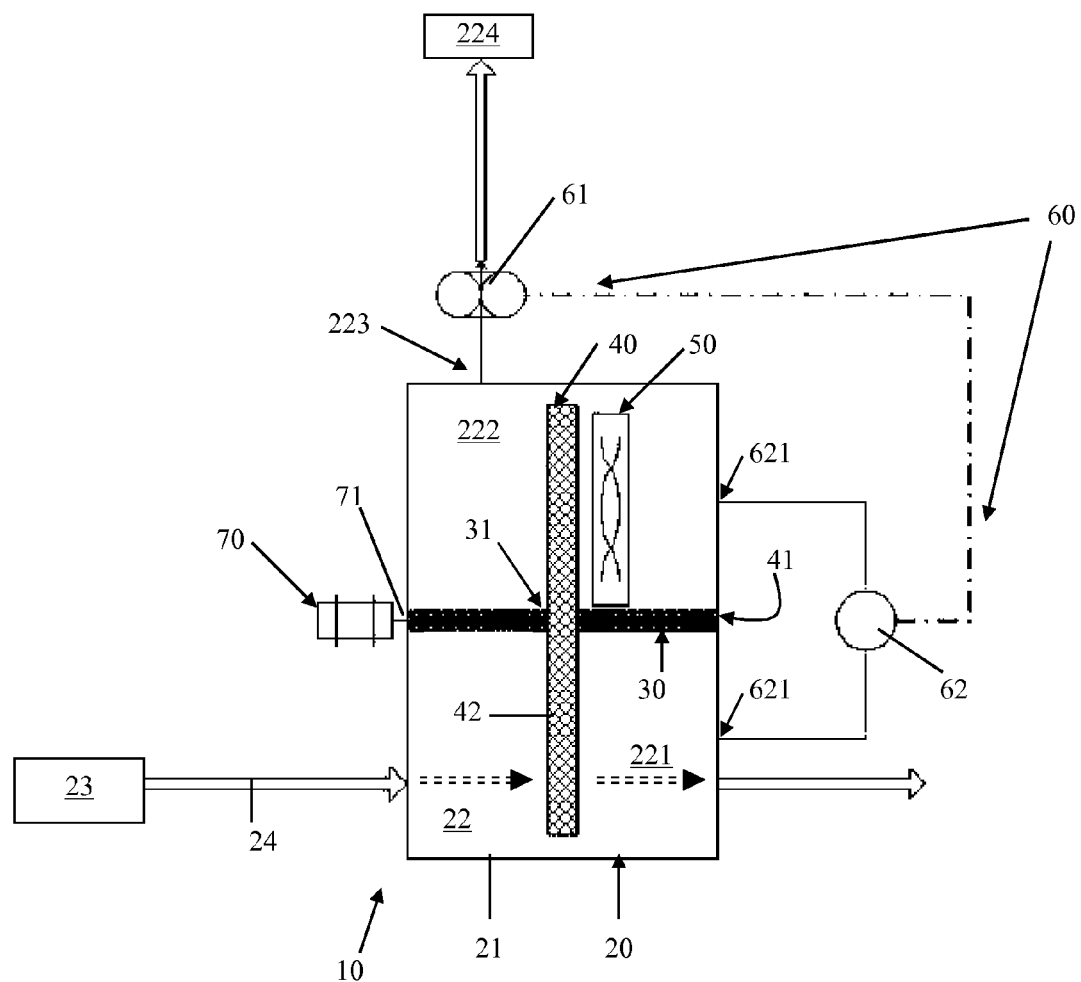
FIG. 1 is a schematic illustration of a turbine outlet frozen gas capture apparatus in accordance with embodiments.

With reference to FIG. 1, a turbine outlet frozen gas capture apparatus ("the apparatus") 10 is provided. The apparatus 10 includes an enclosure 20, a divider 30, a wheel 40, a heater 50 and a system 60. The apparatus 10 can be used with turbo-machinery or cascading turbo-machinery that is configured for separating one gas from another in a gas stream where the subject gas temperature is lowered to the point where the subject gas freezes at the turbine outlet. In accordance with exemplary embodiments, the subject gas may include carbon dioxide or another similar gas, which is cooled to about −225° Fahrenheit by the turbo-machinery and which, when frozen, does not tend to liquefy at atmospheric pressures and may exist as fine particulate matter having individual particle sizes on the order of about 25 microns.

The enclosure 20 is formed as a volumetric body 21 having an interior 22 that is fluidly coupled to a turbine outlet 23 such that turbine outlet exhaust gases 24 produced and output by a turbine are directed to flow into the interior 22. The divider 30 may include an elastomeric seal and is disposed within the interior 22 of the enclosure 20. The divider 30 is thereby disposed to define within the interior 22 of the enclosure 20 a first (i.e., process) chamber 221 and a second (i.e., product) chamber 222. The first chamber 221 may be disposed below the second chamber 222 although this is not necessary and is receptive of the turbine outlet exhaust gases 24, which in accordance with some embodiments, may include frozen gas. The divider 30 is formed to define a slot 31 therein, which provides a pathway between the first chamber 221 and the second chamber 222.

The wheel 40 is disposed within the slot 31 of the divider 30 to straddle the divider 30 and is configured to be rotatable about rotational axis 41 such that one side of the wheel 40 is exposed to the first chamber 221 on one side of the divider 30 and the other side is exposed to the second chamber 222 on the other side of the divider 30. That is, rotational axis 41 extends along a plane of the divider 30 such that each circumferential portion of the wheel 40 sequentially moves into the first chamber 221 and out of the second chamber 222 and vice versa during rotation of the wheel 40. In one embodiment, the wheel 40 includes an inner element 42 such as a wire mesh element, a honeycomb element, collectors, membranes, filters and/or similar elements, which is/are capable of capturing the frozen gas in the first chamber 221 as the flow of the turbine outlet exhaust gases 24 impinge upon the wheel 40. Thus, the frozen gas that is received in the first chamber 221 may be captured by the inner element 42 of the wheel 40 and the captured frozen gas may then be transported by the rotation of the wheel 40 about the rotational axis 41 into the second chamber 222.

The wheel 40 may be rotatably driven by drive element 70, such as a drive motor, for example. The drive element 70 may be disposed within the enclosure 20 and/or at an exterior of the enclosure 20 and may be coupled to the wheel 40 via drive shaft 71 that extends from the drive element 70 to the wheel 40. A longitudinal axis of the drive shaft 71 defines an extension of the rotational axis 41. The disposition of the drive element 70 within the enclosure 20 and/or an exterior of the enclosure 20 may be based on a type of the drive element 70 and a tolerance thereof to low temperature environments.

The heater 50 may include a least one or more radiant heaters, for example, and is disposed within the second chamber 222. In accordance with embodiments, the heater 50 may be positioned proximate to the wheel 40. The heater 50 is thus disposed and configured to heat the frozen gas transported into the second chamber 222. In fact, the heater 50 is disposed and configured to heat the frozen gas such that the frozen gas is vaporized to produce a quantity of vaporized gas within the second chamber 222.

The system 60 is operably coupled to the first chamber 221, the second chamber 222 and an outlet 223 of the second chamber 222. The system 60 is thereby configured to draw the vaporized gas from the second chamber 222 via the outlet 223. The system 60 is further configured to maintain a pressure differential between the first chamber 221 and the second chamber 222, which is sufficient to prevent a flow of the turbine outlet exhaust gases 24 across the divider 30.

In accordance with embodiments, the system 60 may include a compressor 61 or a pump and a controller 62. The compressor 61 is fluidly interposed between the outlet 223 of the second chamber 222 and a vaporized gas outlet 224. The compressor 61 is configured to draw the vaporized gas from the second chamber 222 via the outlet 223 and to urge the vaporized gas toward the vaporized gas outlet 224. The controller 62 is coupled to pressure sensors 621 disposed in the first chamber 221 and the second chamber 22 and configured to measure a differential pressure between the first chamber 221 and the second chamber 222. The controller 62 is further coupled to the compressor 61 and configured to control an operation of the compressor 61 in accordance with the differential pressure. That is, a servo signal issued by the controller 62 to the compressor 61 is generated in accordance with the measured differential pressure and causes the compressor 61 to operate at an associated speed that is sufficient to prevent bulk flow of the turbine outlet exhaust gases from the first chamber 221 into the second chamber 222 via the slot 31.

Figure 2:
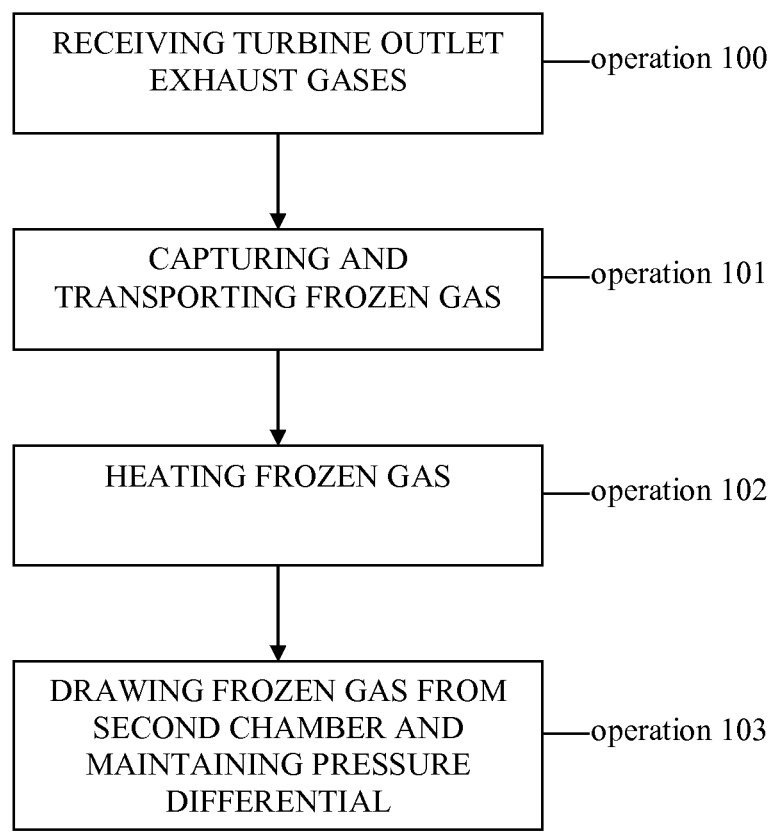
FIG. 2 is a flow diagram illustrating a turbine outlet frozen gas capture method.

With reference to FIG. 2, a turbine outlet frozen gas capture method is provided. As shown in FIG. 2, the method includes receiving turbine outlet exhaust gases 24 including, for example, frozen carbon dioxide gas, within the first chamber 221 of the enclosure 20, which has been sealably divided as described above into the first chamber 221 and the second chamber 222 (operation 100). The method further includes capturing the frozen gas in the first chamber 221 and transporting the captured frozen gas into the second chamber 222 (operation 101) and heating the frozen gas in the second chamber 222 to produce vaporized gas (operation 102). In addition, the method includes drawing the vaporized gas from the second chamber 222 and maintaining a pressure differential between the first chamber 221 and the second chamber 222, which is sufficient to prevent flow of the turbine outlet exhaust gases 24 from the first chamber 221 to the second chamber 222 (operation 103).

The drawing of the vaporized gas from the second chamber 222 of operation 103 may include operating the compressor 61, which is fluidly interposed between the outlet 223 of the second chamber 222 and a vaporized gas outlet 224. In addition, the maintaining of the pressure differential of operation 103 may include measuring a differential pressure between the first chamber 221 and the second chamber 222 and controlling the operating of the compressor 61 in accordance with a result of the measuring.

In accordance with further embodiments, the wheel 40 may provide an additional seal between the first chamber 221 and the second chamber 222 within the slot 31. In such cases, the wheel 40 may be formed of, for example, a honeycomb element that is capable of capturing the frozen gas in the first chamber 221, of transporting the captured frozen gas from the first chamber 221 and into the second chamber 222 and simultaneously maintaining the seal within the slot 31 between the first chamber 221 and the second chamber 222. The system 60 may therefore be used to moderate pressure differentials between the first chamber 221 and the second chamber 222, may be deactivated or may be discarded.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine outlet frozen gas capture apparatus, comprising:
    an enclosure divided into first and second chambers, the first chamber being receptive of turbine outlet exhaust including frozen gas;
    a wheel disposed and configured to be rotatable such that each circumferential portion of the wheel sequentially moves into the first chamber and out of the second chamber and out of the first chamber and into the second chamber such that the frozen gas received in the first chamber is captured by the circumferential portions of the wheel in the first chamber and transported by the circumferential portions of the wheel into the second chamber;
    a heater disposed within the second chamber and configured to vaporize the frozen gas transported therein by the circumferential portions of the wheel to thereby produce vaporized gas; and
    a system configured to draw vaporized gas from the second chamber and to prevent flow of the turbine outlet exhaust from the first to the second chamber in accordance with a pressure differential between the first and second chambers, the system comprising:
    a compressor fluidly interposed between the second chamber and a vaporized gas outlet, the compressor being configured to draw the vaporized gas from the second chamber toward the vaporized gas outlet; and
    a controller configured to measure a differential pressure between the first and second chambers, the controller being coupled to the compressor and configured to control an operation of the compressor in accordance with the differential pressure.

2. The apparatus according to claim 1, wherein the frozen gas and the vaporized gas each comprise carbon dioxide.

3. The apparatus according to claim 1, wherein the wheel comprises a wire mesh element.

4. The apparatus according to claim 1, further comprising a drive element to drive the wheel rotation.

5. The apparatus according to claim 4, wherein the drive element is disposed at one of an exterior or an interior of the enclosure.

6. The apparatus according to claim 1, wherein the heater comprises a radiant heater.

7. A turbine outlet frozen gas capture apparatus, comprising:
    an enclosure;
    a divider disposed to define in the enclosure first and second chambers, the first chamber being receptive of turbine outlet exhaust including frozen gas;
    a wheel disposed to straddle the divider and configured to be rotatable such that each circumferential portion of the wheel sequentially moves into the first chamber and out of the second chamber and out of the first chamber and into the second chamber such that frozen gas received in the first chamber is captured by the by the circumferential portions of the wheel in the first chamber and transported by wheel rotation by the circumferential portions of the wheel into the second chamber;
    a heater disposed within the second chamber and configured to vaporize the frozen gas transported therein by the circumferential portions of the wheel to thereby produce vaporized gas; and
    a system configured to draw the vaporized gas from the second chamber and to maintain a pressure differential between the first and second chambers sufficient to prevent flow of the turbine outlet exhaust across the divider, the system comprising:
    a compressor fluidly interposed between the second chamber and a vaporized gas outlet, the compressor being configured to draw the vaporized gas from the second chamber toward the vaporized gas outlet; and
    a controller configured to measure a differential pressure between the first and second chambers the controller being coupled to the compressor and configured to control an operation of the compressor in accordance with the differential pressure.

8. The apparatus according to claim 7, wherein the frozen gas and the vaporized gas each comprise carbon dioxide.

9. The apparatus according to claim 7, wherein the divider comprises an elastomeric seal.

10. The apparatus according to claim 7, wherein the wheel comprises a wire mesh element.

11. The apparatus according to claim 7, further comprising a drive element to drive the wheel rotation.

12. The apparatus according to claim 11, wherein the drive element is disposed at one of an exterior or an interior of the enclosure.

13. The apparatus according to claim 7, wherein the heater comprises a radiant heater.

14. A turbine outlet frozen gas capture method, comprising:
    receiving turbine outlet exhaust including frozen gas within a first chamber of an enclosure divided by a divider into the first chamber and a second chamber;
    rotating a wheel disposed to straddle the divider such that each circumferential portion of the wheel sequentially moves into the first chamber and out of the second chamber and out of the first chamber and into the second chamber;
    capturing the frozen gas by the circumferential portions of the wheel in the first chamber and transporting the captured frozen gas into the second chamber by the circumferential portions of the wheel;
    heating the frozen gas transported into the second chamber by the circumferential portions of the wheel to produce vaporized gas; and
    drawing the vaporized gas from the second chamber and maintaining a pressure differential between the first and second chambers sufficient to prevent flow of the turbine outlet exhaust from the first chamber to the second chamber, the drawing of the vaporized gas from the second chamber comprising:
    operating a compressor fluidly interposed between the second chamber and a vaporized gas outlet;
    measuring a differential pressure between the first and second chambers; and
    controlling the operating of the compressor in accordance with a result of the measuring.

15. The method according to claim 14, further comprising sealing the first chamber from the second chamber.

* * * * *